April 22, 1947. A. METTRICK ET AL 2,419,223
DRILLING JIG
Filed Jan. 8, 1946
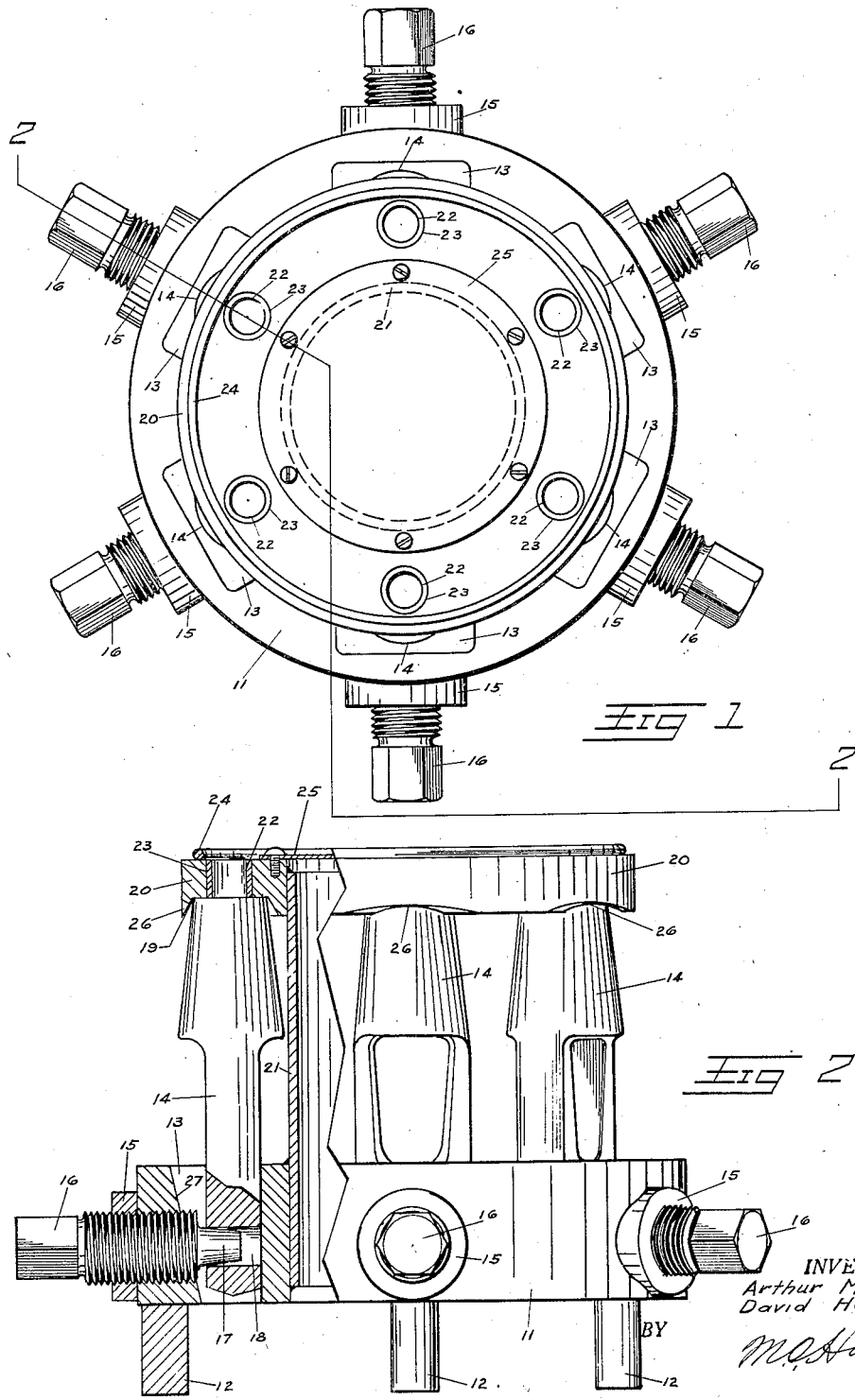
INVENTORS
Arthur Mettrick
David Hook
BY
M. O. Hayes
ATTORNEY Patented Apr. 22, 1947

2,419,223

UNITED STATES PATENT OFFICE 2,419,223

DRILLING JIG

Arthur Mettrick, Bellmore, and David Hook, New York, N. Y.

Application January 8, 1946, Serial No. 639,877

4 Claims. (Cl. 77—62)

(Granted under the act of March 3, 1883, as amended April 30, 1928; 370 O. G. 757)

This invention relates to a drilling jig and more specifically to a jig for drilling close type wire rope sockets on a multiple drill press.

An object of this invention is to provide a jig to hold a plurality of wire rope sockets during the drilling operation on a multiple drilling press.

Another object of this invention is to provide a device in which the wire rope sockets can be quickly and readily inserted and accurately aligned for the drilling operation.

Further objects and advantages of this invention, as well as its construction, arrangement and operation will be apparent from the following description and claims in connection with the accompanying drawings, in which, Figure 1 is a plan view of a preferred embodiment of the present invention.

Figure 2 is a side elevational view with a portion broken away on the line 2—2 of Figure 1.

Referring to the drawings in detail, a preferred embodiment of the present invention is shown in the figures having a ring-shaped body portion 11 supported by the legs 12. The ring-shaped body portion has a plurality of vertical slots 13 extending therethrough and into which fit the lower portion of the wire rope sockets 14. Around the periphery of the body portion are bosses 15 through which extend the bolts 16 having a tapered pin 17 on the inner end. Tapered pin 17 fits snugly in a bore 18 previously drilled in the lower portion of the wire rope socket and forces the upper end of the wire rope socket into a circular recess 19 formed in the upper ring 20. The upper ring 20 is supported by a cylindrical column 21 which is secured to the body portion 11. A plurality of bushings 22 are inserted in bores 23 extending from the upper surface of the ring 20 through to the center portion of the circular recesses 19. An annular ridge 24 is formed around the outer portion of the upper surface of the ring 20 to retain the lubricating fluid used in the drilling operation. Cover plate 25 is secured to the upper ring to enclose the column 21.

The bushings 22 are aligned with the drills of a multiple drill press and guide them into contact with the upper portion of the wire rope sockets 14.

In the operation of the device bolt 16 is withdrawn, the lower end of the wire rope socket 14 is inserted in the slot 13. The upper portion of the wire rope socket 14 is forced upwardly into the circular recesses 19 and the bolt 16 is screwed inwardly, until the tapered pin 17 engages the bore 18 and securely holds the wire rope socket 14 in position for drilling.

When the drilling operation is completed, the finished wire rope socket can be removed by withdrawing the bolt 16. The upper ring is cut away slightly at 26 and the outer surface 27 of the slot 13 is sloped to facilitate the insertion and withdrawal of the wire rope sockets from the jig.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig comprising a ring-shaped body portion, a plurality of vertical slots extending thru said body portion, a plurality of bolts extending inwardly thru said body portion into each of said slots, each of said bolts having a tapered pin on the inner end, an upper ring supported above said body portion, a plurality of circular recesses in the lower surface of said upper ring aligned with said slots, and a plurality of bores extending upwardly from the center of each of said recesses.

2. A jig comprising a ring-shaped body portion, a plurality of vertical slots extending thru said body portion, a plurality of bolts extending inwardly thru said body portion into each of said slots, each of said bolts having a tapered pin on the inner end, an upper ring supported above said body portion, a plurality of circular recesses in the lower surface of said upper ring aligned with said slots, a plurality of bores extending upwardly from the center of each of said recesses, and an annular ridge on the upper surface of said upper ring adjacent the periphery thereof.

3. A jig comprising a ring-shaped body portion, a plurality of vertical slots extending thru said body portion, a plurality of bolts extending inwardly thru said body portion into each of said slots, each of said bolts having a tapered pin on the inner end, an upper ring supported above said body portion, a plurality of circular recesses in the lower surface of said upper ring aligned with said slots, a plurality of bores extending upwardly from the center of each of said recesses, and a cylindrical column secured to the inner peripheries of said body portion and said upper ring to support said upper ring.

4. A jig comprising a ring-shaped body portion, a plurality of vertical slots extending thru said body portion, a plurality of bolts extending inwardly thru said body portion into each of said slots, each of said bolts having a tapered pin on the inner end, an upper ring supported above said body portion, a plurality of circular recesses in the lower surface of said upper ring aligned with said slots, a plurality of bores extending upwardly from the center of each of said recesses, a cylindrical column secured to the inner peripheries of said body portion and said upper ring to support said upper ring, and a circular plate enclosing the top of said cylindrical column.

ARTHUR METTRICK.
DAVID HOOK.